United States Patent [19]

Babu et al.

[11] Patent Number: 5,298,708
[45] Date of Patent: Mar. 29, 1994

[54] MICROWAVE-ACTIVE TAPE HAVING A CURED POLYOLEFIN PRESSURE-SENSITIVE ADHESIVE LAYER

[75] Inventors: Gaddam N. Babu, Woodbury, Minn.; Susan S. Christopher, Spring Valley, Wis.; Pierre H. LePere, Cottage Grove; James R. Peterson, St. Paul, all of Minn.

[73] Assignee: Minnesota Mining and Manufacturing Company, St. Paul, Minn.

[21] Appl. No.: 652,018

[22] Filed: Feb. 7, 1991

[51] Int. Cl.⁵ ............................................. H05B 6/80
[52] U.S. Cl. .................................... 219/728; 219/745; 426/107; 426/113; 426/234; 426/243; 428/156; 428/355; 522/158
[58] Field of Search ............... 219/10.55 E, 10.55 M, 219/10.55 F; 426/107, 113, 234, 243; 428/345, 500, 343, 355, 461; 427/207.1, 208, 208.2, 208.4; 525/279, 232; 229/123.2; 522/158

[56] References Cited

U.S. PATENT DOCUMENTS

| | | | |
|---|---|---|---|
| 4,022,728 | 5/1977 | Trotter et al. | 524/528 |
| 4,102,835 | 7/1978 | Freeman et al. | 260/5 |
| 4,190,757 | 2/1980 | Turpin et al. | 219/10.55 E |
| 4,230,924 | 10/1980 | Brastad et al. | 219/10.55 E |
| 4,267,420 | 5/1981 | Brastad | 219/10.55 E |
| 4,357,383 | 11/1982 | Howden et al. | 428/213 |
| 4,394,917 | 7/1983 | Looser | 215/232 |
| 4,574,174 | 3/1986 | McGonigle | 219/10.55 M |
| 4,640,838 | 2/1987 | Isakson et al. | 426/107 |
| 4,641,005 | 2/1987 | Seiferth | 219/10.55 M |
| 4,664,263 | 5/1987 | Emslander et al. | 206/630 |
| 4,708,249 | 11/1987 | Emslander et al. | 206/630 |
| 4,735,513 | 4/1988 | Watkins et al. | 219/10.55 E |
| 4,865,854 | 9/1989 | Larson | 426/107 |
| 4,873,101 | 10/1989 | Larson et al. | 426/113 |
| 4,911,938 | 3/1990 | Fisher et al. | 426/107 |
| 4,911,960 | 3/1990 | Mudge et al. | 428/34.3 |
| 4,925,684 | 5/1990 | Simon | 426/107 |
| 4,931,327 | 6/1990 | Liu et al. | 428/36.5 |
| 4,962,000 | 10/1990 | Emslander et al. | 428/461 |
| 5,013,795 | 5/1971 | Coleman et al. | 525/279 |
| 5,014,852 | 5/1991 | Herrington et al. | 206/554 |
| 5,038,009 | 8/1991 | Babbitt | 219/10.55 E |
| 5,041,325 | 8/1991 | Larson et al. | 428/156 |
| 5,112,882 | 5/1992 | Babu et al. | 522/158 |
| 5,156,911 | 10/1992 | Stewart | 428/355 |

Primary Examiner—Bruce A. Reynolds
Assistant Examiner—Tu Hoang
Attorney, Agent, or Firm—Gary L. Griswold; Walter N. Kirn; Carolyn V. Peters

[57] ABSTRACT

A piece of microwave-active tape which is odor-free and physiologically inert can be adhered to a food package and remains strongly adhered during cooking at temperatures of at least 200° C. The tape has layers of microwave-active material and a pressure-sensitive adhesive which is a polymeric α-olefin that has been cured to afford a "Peel Value" of at least 5 N/dm and a "Shrink Back" at 220° C. of less than 5%. The tape can have a flexible backing such as a low-adhesion carrier web which can be stripped off from a piece of the tape that has been applied to a microwave food package, or when the backing is heat-resistant, it can be left in place.

20 Claims, 1 Drawing Sheet

MICROWAVE-ACTIVE TAPE HAVING A CURED POLYOLEFIN PRESSURE-SENSITIVE ADHESIVE LAYER

BACKGROUND OF THE INVENTION

1. Field of the Invention

The invention relates to pressure-sensitive adhesive tapes and further to their uses on food packages.

2. Background Art

The use of microwave energy revolutionized food preparation and has now become common place. However, the advantages associated with microwave usage are tempered with compromises to food appearances, texture and sometimes ease of preparation.

To compensate for the microwave oven's inability to crisp and brown the surface of foods and to prevent foods, highly absorptive of microwave energy from being overheated, resulting in toughening and dehydration of the food, two specific "microwave active" packaging components have been developed: microwave susceptors and microwave shields.

Microwave susceptors are devices which heat in response to microwave energy, converting microwave energy into thermal energy to produce browning and/or crisping of food surfaces placed in contact with microwave susceptors. Susceptors may be constructed by a variety of methods such as vacuum metallization of polymer substrates, or conductive particles dispersed in a suitable binder. Microwave susceptors convert a portion of the incident microwave energy into sensible heat.

Microwave shields are devices that do not heat appreciably in response to microwave energy, but reflect virtually all incident microwaves. Metallic foils are generally employed as microwave shields.

Microwave active devices that are microwave absorbing or shielding are disclosed in U.S. Pat. No. 4,190,757. The food packaging described in the '757 patent includes a heating body that is a laminate of a supporting sheet and a layer of an "absorptive lossy substance." The packaging also includes a shield, such as metallic foil to reflect microwaves. However, the metallic foil can be perforated to allow a proportion of the microwave energy to reach the food.

The food packaging described in U.S. Pat. No. 4,230,924 includes a flexible sheet of dielectric material, such as polyester substrate having an ultrathin metallic coating that is subdivided into islands with nonmetallic gaps or strips therebetween. When the food package is placed in a microwave oven, some of the microwave energy passes through the sheet. A lesser amount of the microwave energy is converted into thermal energy by the metallic coating, which functions as a microwave absorber, thus permitting browning or crisping of adjacent food.

The subject matter of U.S. Pat. No. 4,267,420 is similar to that of the '924 patent, supra, but includes an additional sheet or substrate of plastic laminated to the metallic coating.

The microwave susceptor packaging described in the aforementioned patents allows the surface of packaged food to be heated by thermal energy. The combination of microwave and thermal heating permits browning and crisping times to be correlated with heating times.

An alternative use of a microwave susceptor is to vent a vapor-tight package U.S Pat. No. 4,640,838 describes a microwave susceptor incorporated into a tape that has a low-adhesion carrier web bearing a layer of graphite or carbon black particles and a layer of pressure-sensitive adhesive (PSA) by which a piece of the tape is adhered to a package. After the carrier web is stripped off, the package is placed in a microwave oven and heat generated in the graphite or carbon black layer automatically vents the package. Package venting is achieved by softening and weakening the package material underneath the tape. Alternatively, when the tape covers an opening in the package material below the susceptor, venting is achieved by softening and weakening the tape itself.

Generally, microwave susceptor packaging consists of aluminum vapor-coated poly(ethylene terephthalate) ("PET") substrate, adhesive laminated to paper or paperboard such as is in U.S. Pat. Nos. 4,641,005 and 4,735,513. The packaging is formed into popcorn bags, pizza trays and the like.

Microwave susceptors fashioned into a pressure sensitive tape or into an adhesive label, advantageously permit the user the flexibility of attaching the tape or label at any position on a finished product. A previously commercialized microwave susceptor label that employed an acrylic-based PSA, produced a noxious odor when the label was heated. The odor arising from heating the labels apparently caused the labels to be withdrawn from the market shortly after their introduction.

SUMMARY OF THE PRESENT INVENTION

Briefly, the present invention provides a novel microwave active tape comprising a PSA layer such that a piece of the tape can be selectively adhered to any portion of a food package. The PSA of the novel tape is virtually odor-free when heated. Furthermore, the PSA of the novel tape is used on food packages without physiological hazard and without affecting the taste of the food.

The present invention comprises:
a) a backing layer
b) a layer of microwave active material, and
c) a pressure-sensitive adhesive, applied to said layer of microwave active material.

The PSA is a polymeric α-olefin that has been cured to afford a "Peel Value" (defined below) of at least 5 N/dm and a "Shrink Back" at 220° C. (defined below) of less than 5%.

In another aspect, the present invention provides a method of selectively heating and/or browning foods, that require disproportionate heating times, comprising positioning a first piece of the novel microwave active tape adjacent to a portion of food requiring crisping and browning and positioning a second piece of microwave active tape adjacent to a portion of food that requires slower cooking times, wherein said first piece of tape is a microwave susceptor that converts a portion of the microwave energy into thermal energy and said second piece of tape is a microwave shield that essentially reflects microwave energy.

In another aspect, the present invention provides a method of steam venting comprising the steps of positioning a piece of microwave susceptor tape on the outside of an air-tight polymer package containing food, or over a portion of a heat-sealed seam of such package. As the food is microwaved, steam evolves and causes the package to expand. The piece of tape adhered to the outside of the package heats and softens the underlying packaging, which ruptures and allows the steam to escape. Alternatively, a piece of tape positioned over the package heat-seal seam heats and softens the heat-seal at that point and allows it to open and vent as the steam pressure within the package builds.

Advantageously, the PSA of the novel tape adheres strongly to cardboard, plastic substrates, and other materials commonly used in microwave food packages, including low-energy non-polar substrates such as poly(4-methylpent-1-ene), and remains strongly adhered at temperatures from −20° C. to 200° C. and even higher temperatures to which a microwave active tape can be heated in a microwave oven, without production of the noxious odors present in the earlier described tapes. During cooking, the adhesive resists shrinkage and prevents the backing from shrinking, thus allowing the absorbing or shielding function of the tape to continue throughout the cooking operation. Because of the adhesive's stability, the tape may be stored indefinitely without noticeable degradation. Additionally, a piece of the tape can be adhered to any part of a microwave food package without requiring special apparatus generally needed when an adhesive is activated by heat or solvent. Also, the tape can be used as an automatic steam release device for thermoplastic packaging to prevent package bursting from built-up steam pressure during microwave heating.

In this application:

"shrink back" means a value measured by a test method hereinafter described;

"peel value" means the force required to remove a PSA coated sample at a specific angle and rate of removal measured by a test method hereinafter described;

"IV" means inherent viscosity of the polyolefin PSA;

"microwave active" means a component which affects change in microwave energy incident upon it;

"microwave susceptor" is a microwave active component that converts a portion of the incident microwave energy into sensible heat; and "microwave shield" is a microwave active component that reflects virtually all incident microwave energy.

DETAILED DESCRIPTION OF THE PREFERRED EMBODIMENT

This invention relates to microwave active tapes, particularly to pressure-sensitive adhesive tapes and further to their uses on food packages.

Figure 1:
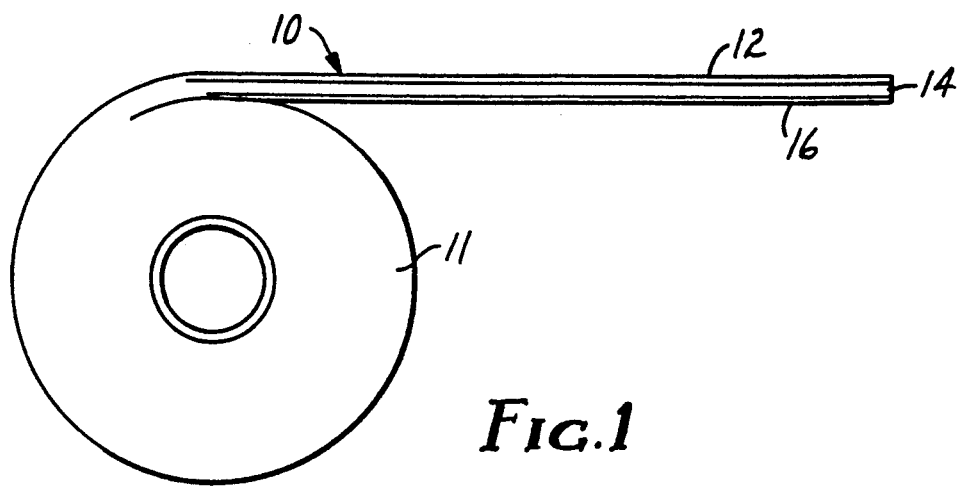
FIG. 1 is a schematic representation of a side elevation of a roll of microwave active tape of this invention.

Referring to FIG. 1, microwave active tape 10 unwound from roll 1. The tape 10 comprises a heat-resistant polymeric or paper backing 12 bearing microwave active layer 14. Overlying microwave active layer 14 is pressure-sensitive adhesive (PSA) layer 16.

Although heat-resistant polymeric backing 12 as described can be biaxially-oriented poly(ethylene terephthalate), biaxially-oriented polypropylene, or poly(4-methylpent-1-ene), any similar high temperature melt extrudable thermoplastic substrates known to those skilled in the art may be used and still be within the spirit and scope of the present invention.

Microwave active layer 14 is a thin vapor deposited layer that primarily converts microwave energy to thermal energy.

Figure 2:
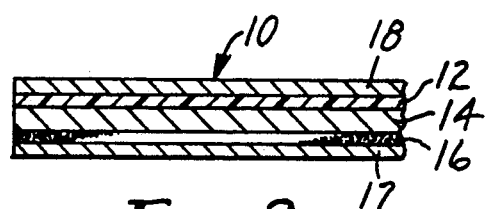
FIG. 2 is a cross sectional view of a preferred embodiment of a microwave active tape.

Referring to FIG. 2, a preferred embodiment of microwave active tape 10 is described that comprises a heat-resistant backing layer 12, microwave-active layer 14 adjacent to one surface of said backing layer 12, and pressure sensitive adhesive (PSA) layer 16 coated directly on the exposed surface of microwave active layer 14. To permit winding of the tape on a roll without blocking, i.e., sticking to itself, release liner 17 may be placed over the exposed surface of PSA layer 16. Alternatively, release coating 18 may be applied to the upper surface of backing layer 12. Optionally, both treated release liner 17 and release coating 18 may be used.

Microwave active layer 14 of novel tape 10 can be constructed from either microwave absorbing material or microwave shielding material. Examples of absorbing material and shielding material are well-known in the art, for specific examples, see U.S. Pat. No. 4,640,838 that discloses microwave absorbing materials may include graphite or carbon black particles dispersed in a binder material; U.S. Pat. No. 4,190,757 discloses metal oxide particles or other absorptive lossy substances; U.S. Pat. No. 4,230,924 discloses ultrathin metallic substrates, having resistivities in the range of 1 to 300 ohms per square, or vapor-deposited substrates of aluminum or stainless steel having resistivities in the range of 300–1200 ohms per square, that are inexpensive and currently used in the food packaging industry.

Microwave shielding materials include relatively thick substrates of electrically conductive metals such as aluminum foil that reflect microwave energy without appreciably generating thermal energy. The degree of shielding can be reduced by perforations or by dividing the foils into islands surrounded by microwave transparent gaps.

Microwave active layer 14 may be selected such that the resulting microwave tape 10 is a susceptor, or a shield. Microwave active layer 14 may be a metallized substrate or a metal foil. If a metallized layer is used as microwave active layer 14, the thickness of the layer will determine whether the resulting tape is a susceptor or a shield. Although a vacuum metallization process is preferably employed to deposit a metallic layer on backing layer 12, other processes known in the art can also be used, such as electroless or electrolytic deposition methods. The process is continued until the desired thickness of the layer is obtained. Generally, a thin vacuum metallized poly(ethylene terephthalate) (PET) layer at thicknesses in the range of 50 to 500 Angstrom (Å) units are used for microwave susceptors. Metals used for the susceptor layer are typically aluminum or stainless steel, although other metals or metal alloys may also be used. Typically, a metallic layer having a thickness greater than 1 micrometer ($\mu$m) will essentially reflect microwaves, without arcing or appreciable heating.

Generally, a metal foil having a thickness greater than 1 micrometer is used as a microwave shield. The metal foil, typically aluminum, is adhesive laminated to backing layer 12. A continuous metal foil shields microwaves, that is, it reflects virtually all incident microwave energy. Metal mesh, grids or perforations in the metal or metal foil, having apertures or openings greater than about 2 mm in diameter, will provide partial shielding.

Figure 3:
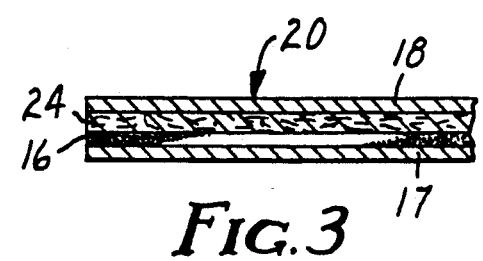
FIG. 3 is a cross sectional view of an alternative embodiment of a microwave susceptor tape.

Referring to FIG. 3, another embodiment of microwave-active tape 20 is described. Tape 20 comprises microwave active layer 24, wherein microwave active layer 24 comprises particles dispersed in an organic binder, and PSA layer 16 is coated directly on the exposed surface of microwave active layer 24. As shown in FIG. 2 or 3, release liner 17 may be placed over the exposed surface of PSA layer 16. Alternatively, release coating 18 may be used. Optionally, both release liner 17 and release coating 18 may be used.

The conductive particles dispersed in a suitable organic binder extruded or calendared into a flat substrate will produce a microwave susceptor. Organic binders include but are not limited to soluble polyester (Vitel TM PE-222, Goodyear Chemicals), and silicone resin (RTV TM 615, G. E. Silicone Prod. Div.). The conductive particles include but are not limited to carbon black, graphite, or metal powder or flakes. Thin coatings of conductive paints such as those containing graphite, carbon black, metal particles or flakes on a suitable high temperature polymer backing may also be used for susceptors. Conductive paints such as Isolex TM RFI/EMI Coating Systems (Bee Chemical Co.), which contain for example, graphite, silver or nickel and Advanced Polymer Thick Film (Hunt Advanced Coatings and Chemicals), which also contain graphite, silver or nickel are useful in the practice of the present invention.

Figure 4:
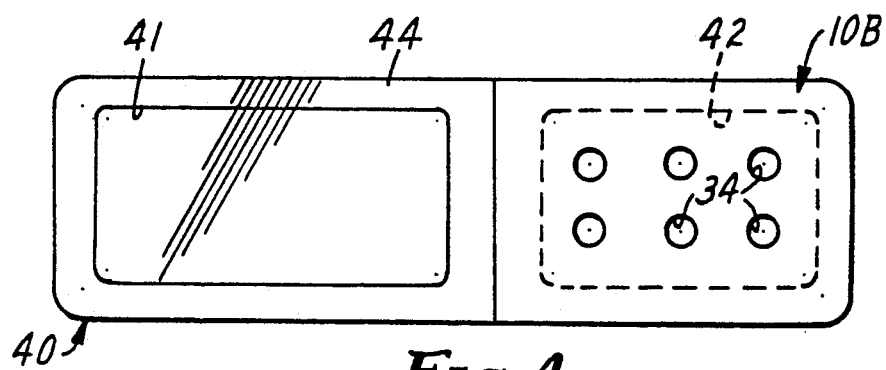
FIG. 4 is a top view of a microwaveable food package to which pieces of microwave active tape of the invention have been adhered.
Figure 5:
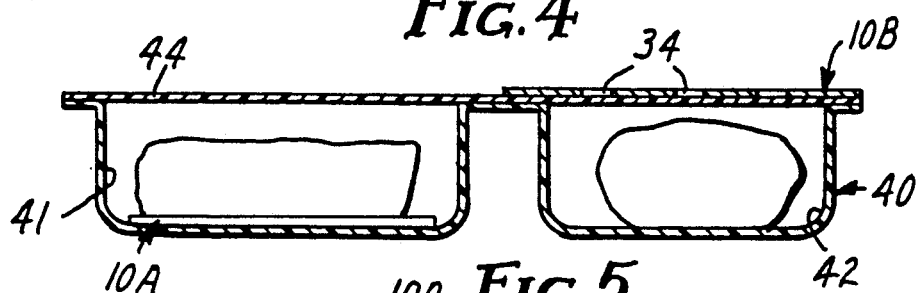
FIG. 5 is a cross sectional view of FIG. 4.
Figure 6:
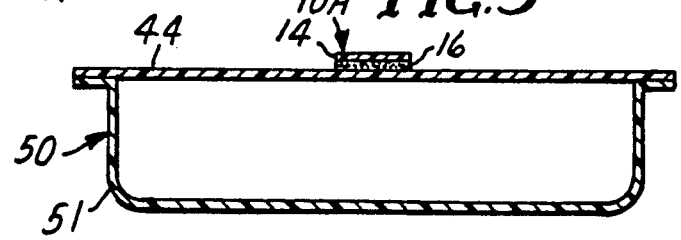
FIG. 6 is a cross sectional view of a microwaveable food package with a vent tape comprising a piece of microwave active tape.

The descriptions referring to FIGS. 4 to 6 can be fabricated from either embodiment as shown in FIGS. 2 or 3.

FIG. 4 shows microwave food package 40 whereon microwave transparent thermoplastic layer 44 seals package 40. Thermoplastic layer 44, without any active tape 10 (not shown) adhered to the surface, extends over the opening of first food compartment 41 allowing all microwave energy incident upon layer 44 to pass through to the food (not shown). A piece of tape 10B, fabricated to be microwave shielding extends over the opening of second food compartment 42. By perforating microwave active layer 14 (not shown) of microwave tape 10B, only a portion of the incident microwave energy passes through perforations 34, reaching the food (not shown) in second food compartment 42.

Referring to FIG. 5, which shows a cross-section of microwave package 40 of FIG. 4, piece of tape 10A, fabricated to be microwave absorbing is adhered to the bottom of first food compartment 41. Piece of tape 10B is adhered to the outer surface of thermoplastic layer 44 that seals the opening of second food compartment 42. Perforations 34 permit microwave energy to pass through an otherwise shielding piece of tape 10B.

FIG. 6 shows microwave package 50 comprising molded plastic tray 51, sealed with thermoplastic layer 44. A piece of microwave susceptor tape 10A is positioned and adhered by means of PSA layer 16 to the outer surface of thermoplastic substrate 44. Heat generated in microwave susceptor layer 14 (not shown) softens and weakens thermoplastic substrate 44, such that vapor generated (not shown) within microwave package 50 perforates the substrate and vents through the piece of tape 10A.

Pressure sensitive adhesives used in the present invention include but are not limited to curable adhesive compositions comprising (a) one or more poly($\alpha$-olefin) polymers derived from monomers containing 6 to 10 carbon atoms and (b) a photoactive crosslinking agent. The PSA selected is capable of adhering to the surface of a package or container on contact and during storage conditions, which can range from $-20°$ C. to room temperature. The PSA is sufficiently heat resistant to allow the microwave active tape to remain adhered to the package without allowing oriented backings to curl or shrink more than 5% of their linear dimensions at temperatures exceeding 200° C. for a period of time normally expected in microwave cooking. Furthermore, the PSA desirably is virtually free of noxious odors even at elevated temperatures, physiologically inert, and is capable of adhereing aggressively to both polar and non-polar substrates.

Another pressure sensitive adhesive that may be used to practice the present invention is a radiation curable poly($\alpha$-olefin) containing adhesive composition that is pressure-sensitive at room temperature and upon cure yields an adhesive substrate having an excellent balance of peel and shear adhesion. The radiation curable PSA preferably has an inherent viscosity (IV) value of 3 to 4 and is coated from solution or hot-melt extrusion die coated by methods well-known to those skilled in the art.

Preferably the PSA used in the present invention is disclosed in assignee's co-pending patent application Ser. No. 07/403,622, filed Sep. 6, 1989 and comprises:
(a) at least one polymer comprised of: 85 to 100 mole percent, preferably 85 to 99 mole percent of one or more $C_6$ to $C_{10}$ $\alpha$-olefin monomers, and 15 to 0 mole percent, preferably 15 to 1 mole percent, of one or more non-conjugated polyene monomers, with the proviso that the mole percentage of all monomers sum to 100, and
(b) sufficient photoactive crosslinking agent to crosslink the composition upon irradiation from a source of actinic radiation.

The preferred PSA polymer useful in the present invention has a glass transition temperature ($T_g$) in the range of $-70°$ C. to $0°$ C. and an inherent viscosity in the range of 1.5 to 9.0 dl/g. The PSA's are hot-melt coatable when the inherent viscosity of the radiation curable poly($\alpha$-olefin) polymer is in the range of 1.5 to 4.0 dl/g. However, radiation curable poly($\alpha$-olefin) polymer having inherent viscosities in the range of 4.0 to 9.0 dl/g may be coated from toluene solution by methods well known to those skilled in the art to yield cured PSA films having superior shrink back, scorch values and crack values. Number average molecular weights of the polymers are generally in the range of 5,000 to 50,000,000.

The preferred PSA radiation-curable $\alpha$-olefin polymers used in the present invention have the general formula:

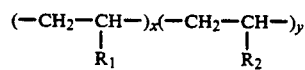

$R_1$ can be selected from monovalent hydrocarbon groups containing 4 to 8 carbon atoms. Representative examples include, but are not limited to: 1-butyl, 1-pentyl, 1-hexyl, 1-heptyl, 1-octyl; and branched hydrocarbon radicals such as 2-methylbutyl, 2-ethyl-butyl, 3-methyl-hexyl, 2-ethyl-hexyl, 5-methyl-hexyl, 5-ethyl-hexyl, etc.

$R_2$ can be a monovalent hydrocarbon group containing one or more ethylenically unsaturated groups selected from the group consisting of: $(-CH_2-)_nR_3$, $-Ar-R_3$, $(-CH_2-)_nQ-R_3$
n=0 to 14.

$R_3$ can be a $C_2$ to $C_{10}$ monovalent hydrocarbon group containing one or more ethylenically unsaturated groups.

Ar can be a divalent aromatic group containing 1 or 2 fused or catenated aromatic rings with from 0 to 8 substituents selected from the group consisting of alkyl, aryl, cycloalkyl, alkoxy, and aryloxy containing from 1 to 12 carbon atoms.

Q can be a divalent group selected from the group consisting of:

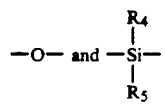

$R_4$ and $R_5$ are the same or different $C_1$ to $C_{10}$ monovalent organic groups selected from the group consisting of alkyl, cycloalkyl, alkaryl, aryl, alkoxy and aryloxy. x is the mole percent of one or more $C_6$ to $C_{10}$ α-olefin monomer(s), the total ranging from 85 to 100 mole percent; and y is the mole percent of one or more non-conjugated polyene monomer(s), the total y ranging from 15 to 0 mole percent, with the proviso that (x+y)=100 mole percent.

Additional variations of radiation curable polyolefin pressure sensitive adhesives used in the present invention may be found in the co-pending patent application identified as Ser. No. 07/403,622, filed Sep. 6, 1989.

A second pressure sensitive adhesive that may be used in the fabrication of the present invention is disclosed in assignee's co-pending patent application Ser. No. 07/605,653, filed Oct. 30, 1990 and comprises a curable blend of (a) an α-olefin polymer containing ethylenic unsaturation, (b) a crosslinker having at least 2 hydrosilyl groups, and (c) a hydrosilation catalyst. This PSA preferably has an IV of at least 1.5.

The α-olefin polymer of the second PSA composition has the general formula:

$(-M^1)_a-(M^2)_b-(M^3-)_c$ a, b, and c are numbers designating the relative molar amounts of $M^1$, $M^2$, and $M^3$ units that are randomly located in the backbone chain of the polymer such that the polymer has the weight average molecular weight in the range of 30,000 to 3.5 million, a is at least 60 mole % of (a+b) wherein b can be zero, and c is 0.1 to 10 mole % of (a+b+c).

$M^1$ is an ethanediyl repeat unit having a pendent hydrocarbyl group having 4 to 12 carbon atoms.

$M^2$, when present, is different from $M^1$, and is an ethanediyl repeat unit selected from
1) ethylene,
2) units having a pendent hydrocarbyl group selected from linear and branched alkyl groups having 1 to 18 carbon atoms, cyclic alkyl groups and aryl groups having 5 to 18 carbon atoms, and
3) 1,2-cyclopentylene and 1,2-cyclohexylene groups having 5 to 18 carbon atoms.

$M^3$ is an ethanediyl repeat unit having a pendent ethylenically-unsaturated aliphatic or aryl group selected from the group consisting of
1) linear and branched mono- and polyethylenically-unsaturated hydrocarbyl groups having 3 to 18 carbon atoms,
2) cyclic mono- and polyethylenically-unsaturated aliphatic groups optionally containing at least one of oxygen and nitrogen heteroatoms, the groups having 5 to 18 carbon atoms,
3) aryl groups substituted by mono- or polyethylenically-unsaturated groups having a total of 7 to 18 carbon atoms, and
4) cycloalkylene groups having 6 to 18 carbons atoms wherein the cyclic group has at least 6 carbon atoms in the ring, provided that the ethylenically-unsaturated (C=C) moiety is not bonded directly to a backbone carbon atom.

Additional variations of pressure sensitive adhesives based on ethylenically-unsaturated α-olefin polymers cured with hydrosilane and used in the present invention may be found in the co-pending patent application identified as Ser. No. 07/605,653.

A third alternative for a pressure sensitive adhesive for use in the fabrication of the present invention are moisture-curable polyolefin based adhesives and are disclosed in assignee's co-pending patent application Ser. No. 07/585,227, filed Sep. 19, 1990. The PSA based on the moisture-curable α-olefin polymers are hot melt coatable when their IV value is in the range of 1.5 to 4.0 dl/g. However, moisture curable poly(α-olefin) polymers having an inherent viscosity of 4.0 to 9.0 dl/g can be coated from solution by methods well known to those in the art. Such cured PSA films have superior shrink back, scorch values and crack values.

The moisture-curable α-olefin polymer of the third PSA composition has a hydrocarbyl backbone and the general formula:

$(-M^4)_d-(M^5)_e-(M^6-)_f$ d, e, and f are numbers designating the relative molar amounts of $M^4$, $M^5$, and $M^6$ units that are randomly located in the backbone chain of the polymer such that the polymer has the weight average molecular weight of at least 30,000, d is at least 60 mole % of (d+e) wherein e can be zero, and f is 0.1 to 10 mole % of (d+e+f).

$M^4$ is a repeat unit present in a polymer formed upon polymerization of an α-olefin having 6 to 14 carbon atoms.

$M^5$ is a saturated or unsaturated repeat unit present in a polymer formed upon polymerization of ethylenically-unsaturated hydrocarbons selected from α-olefins having 2 to 20 carbon atoms, non-conjugated dienes having 5 to 20 carbon atoms, and non-conjugated mono- and polyethylenically-unsaturated mono- and polycyclic hydrocarbons having 6 to 20 carbon atoms.

$M^6$ is the same as $M^2$ but is substituted by a hydrolyzable or condensable silyl group.

Additional variations of moisture-curable polyolefin pressure sensitive adhesive used in the present invention may be found in the co-pending patent application identified as Ser. No. 07/585,227.

Any polymeric α-olefin that has an inherent viscosity of at least 5 tends to afford a "Shrink Back" at 220° C. of least 5 N/dm and so does not need to be cured to be used in the fabrication of the microwave susceptor tapes of the present invention. However, high IV values render the adhesive difficult to coat at commercially useful line speeds.

Other useful pressure sensitive adhesives that may be used in the fabrication of the present invention are obtained from blends of uncured polymeric α-olefins with various combinations of thermoplastic polymers.

Testing

Where indicated, the test procedures used in the examples to evaluate and compare the properties of the tapes are industry standard tests. These tests are described in detail in various publications of the American Society for Testing Materials (ASTM), Philadelphia, Pa. and the Pressure Sensitive Tape Council (PSTC), Glenview, Ill. References to these standards are also given.

Shrink Back, Scorch Value, and Crack Value

1) A thin coating of aluminum is deposited by vapor-deposition onto 0.96-mil (24.4-μm) biaxially-oriented poly(ethylene terephthalate) substrate, to a thickness affording approximately 50% optical transmission.

2) The pressure-sensitive adhesive to be evaluated (dried coating weight 3.8 mg/cm$^2$) is coated onto the vapor-coated side of the poly(ethylene terephthalate) substrate to produce a microwave susceptor tape of the invention.

3) A piece of the tape 3"×3" (7.5 cm×7.5 cm) is cut and adhered by its pressure-sensitive adhesive layer to the clay-coated side of a larger paperboard having a basis weight of 330 g/m$^2$, using a 2" (5 cm) wide, 4-lb. (1.8-kg) hard rubber roller, rolled back and forth three times in each direction.

4) Using a felt-tip pen, the piece of tape is outlined.

5) The sample is aged for at least 12 hours before proceeding.

6) The sample is placed on ¼" (0.6 cm) plastic shims centered on the floor of a microwave oven (625 watt, 0.045 m$^3$), wherein the shims are outside of the outlined area.

7) The microwave oven is operated at full power for 30 seconds, thus heating the surface of the vapor-deposited aluminum to about 220° C. (as measured with Luxtron ™ MIW fluoroptic probes of a Luxtron ™ model 750 system from Luxtron, Mountain View, Calif.; typically the surface temperature at the center of the sample is about 5° C. higher than at the edges).

8) The back side of the paperboard is examined and if the entire outlined area is discolored (scorched), the test is continued. If not, the test will be invalid due to insufficient heating.

9) The maximum shrinkage of the tape is measured from any edge of the outline. The shrinkage value obtained is the "Shrink Back" of the sample. 5% or less is considered to be in an acceptable range.

10) The face of the tape is examined for the "Scorch Value":

1=no scorching
2=slight scorching
3=brown color
4=face disrupted (adhesive oozing)
Ratings 1-3 are acceptable for many purposes.

11) The face of the tape is examined for the "Crack Value", that is any cracking of the poly(ethylene terephthalate) substrate:

1=no cracking visible to naked eye
2=cracking barely visible to naked eye
3=cracking readily apparent
4=adhesive oozing through cracks
Ratings 1-3 are acceptable for many purposes.

Peel Value [ASTM D 3330-78; PSTC—1 (11/75)]

The peel adhesion is the force required to remove a PSA coated test specimen from a test panel measured at a specific angle and rate of removal. In the examples, this force is expressed in Newtons per decimeter width (N/dm) of coated sheet. The procedure followed is:

1) A test specimen 25.4 mm wide is applied to a horizontally positioned clean glass test plate. A 2.2 kg rubber roller is used to press a 12.7 cm length of specimen into firm contact with the glass surface.

2) The free end of the specimen is doubled back nearly touching itself so the angle of removal is 180°. The free end is attached to the adhesion tester scale.

3) The glass test plate is clamped in the jaws of tensile testing machine which moves the plate away from the scale at a constant rate of 2.3 meters per minute.

4) The scale reading is recorded as the tape is peeled from the glass surface, and the "Peel Value" in N/dm is calculated.

EXAMPLES

Advantages of this invention are further illustrated by the following examples, but the particular materials and amounts thereof recited in these examples, as well as other conditions and details, should not be construed to unduly limit this invention.

In making each of the α-olefin polymers, pressure-sensitive adhesives, and tapes as described below, all parts are given by weight. Unless otherwise stated or apparent all materials used in the following examples are commercially available.

SYNTHESIS OF POLYOLEFIN PRESSURE-SENSITIVE ADHESIVES FOR MICROWAVE ACTIVE TAPE APPLICATIONS

Radiation-curable Polyolefins

Polymers A

A solution of 112 grams (1.0 mole) 1-octene in 450 grams of heptane was polymerized with 10 millimoles of diethylaluminum chloride (Et$_2$AlCl) and 4 millimoles of aluminum activated reduced titanium trichloride (AATiCl$_3$) (Stauffer Chemical Co., Inc.) at 30° C. for 4 hours. During the course of the reaction, hydrogen was bubbled through the reaction mixture to control the viscosity. The (IV) polymer yields and inherent viscosities were:

| Polymer | Yield (%) | IV (dl/g) |
|---------|-----------|-----------|
| A$_1$   | 85        | 2.9       |
| A$_2$   | 80        | 4.0       |
| A$_3$   | 78        | 4.9       |

Polymers B

A solution of 109.8 grams (0.98 mole) 1-octene and 2.16 grams (0.02 mole) of 4-vinylcyclohex-1-ene (molar charge ratio 98:2) in 450 grams of heptane was polymerized with Et$_2$AlCl (5 millimoles) and AATiCl$_3$ (2.5 millimoles) at 30° C. for 6 hours. The polymer yields and inherent viscosities were:

| Polymer | Yield (%) | IV (dl/g) |
|---|---|---|
| $B_1$ | 62 | 2.8 |
| $B_2$ | 65 | 5.0 |

Polymers C

A solution of 84 grams (1.0 mole) 1-hexene in 450 grams of heptane was polymerized with the required amount of $Et_2AlCl$ (16 millimoles) and $AATiCl_3$ (4.0 millimoles) at 30° C. for 24 hours. The polymer yields and inherent viscosities were:

| Polymer | Yield (%) | IV (dl/g) |
|---|---|---|
| $C_1$ | 82 | 1.9 |
| $C_2$ | 88 | 2.9 |
| $C_3$ | 80 | 6.5 |

Polymer D

A solution of 79.8 grams (0.95 mole) 1-hexene and 5.4 grams (0.05 mol) 4-vinylcyclohex-1-ene (molar charge ratio 95:5) in 450 grams of heptane was polymerized with $Et_2AlCl$ (10 millimoles) and $AATiCl_3$ (4 millimoles) at 30° C. for 4 hours. During the course of the reaction, hydrogen was bubbled through the reaction mixture to control the viscosity. The polymer yield was 68 percent and inherent viscosity was 3.8 dl/gram.

Thermally-Curable Hydrosiloxane Polyolefins

Polymer E

A solution of 81.5 grams (0.966 mole) 1-octene and 5.61 grams (0.0509 mole) 1,7-octadiene (molar charge ratio 95:5) in 450 grams of heptane was polymerized with $Et_2AlCl$ (16 millimoles) and $AATiCl_3$ (4 millimoles) at 50° C. for 10 hours. During the course of the reaction, hydrogen was bubbled through the reaction mixture. The conversion of the polymer was 52 percent, inherent viscosity was 1.9 dl/gram. The composition of monomers in the copolymer was 97:3 mole ratio from NMR analysis.

Polymer F

A solution of 106.4 grams (0.95 mole) 1-octene and 5.5 grams (0.0509 mole) 1,7-octadiene (molar charge ratio 95:5) in 450 grams of heptane was polymerized with $Et_2AlCl$ (16 millimoles) and $AATiCl_3$ (4.0 millimoles) at 50° C. for 10 hours. During the course of the reaction, hydrogen was bubbled through the reaction mixture. The conversion of the polymer was 65 percent, inherent viscosity was 2.1 dl/gram. The composition of monomers in the copolymer was 97:3 mole ratio from NMR analysis.

Radiation-Curable Hydrosiloxane Polyolefins

Polymer G

A solution of 985.94 grams (11.715 mole) 1-hexene and 58.24 grams (0.4831 mole) 1,7-octadiene (molar charge ratio 96:4) in 450 grams of heptane was polymerized with $Et_2AlCl$ (13.5 millimoles) and $AATiCl_3$ (6.97 millimoles) at 25° C. for 20 hours. During the course of the reaction, hydrogen was bubbled through the reaction mixture. The conversion of the polymer was 62 percent, inherent viscosity was 1.6 dl/gram. The composition of monomers in the copolymer was 97.8:2.2 mole ratio from NMR analysis.

Polymer H

A solution of 416.53 grams (3.711 mole) 1-octene and 8.35 grams (0.0758 mole) 1,7-octadiene (molar charge ratio 98:2) in 450 grams of heptane was polymerized with $Et_2AlCl$ (4.14 millimoles) and $AATiCl_3$ (2.75 millimoles) at 25° C. for 26 hours. During the course of the reaction, hydrogen was bubbled through the reaction mixture. The conversion of the polymer was 56 percent, inherent viscosity was 1.3 dl/g. The composition of monomers in the copolymer was 99:1 mole ratio from NMR analysis.

Moisture-curable Polyolefin

Polymer I 50 grams of 1-hexene-1,7-octadiene (97:3 molar ratio) copolymer having an inherent viscosity in heptane of 1.9 dl/gram was dissolved in 500 grams of toluene. This was refluxed under nitrogen, and about 20 ml of toluene was distilled out to ensure the removal of the water in the system. 2.9 grams of triethoxysilane was added together with bis(divinyltetramethyldisiloxane)Pt(0) catalyst in an amount sufficient to give 100 ppm of platinum based on combined quantity of polyolefin and alkoxysilane. The reaction was run for 48 hours. Progress of the reaction was monitored by spectral analysis. At the end of the reaction, the copolymer was precipitated in dry methanol under anhydrous conditions. The silane moiety of the copolymer was found to be 2.7 mole percent using spectral analysis.

Pressure-Sensitive Adhesive Tapes 1–30

Solutions of each of tackified and non-tackified Polymers A–D and 1.0 wt % (based on polymer) benzophenone in toluene were knife coated onto the vapor coated side of 0.96 mil (24.4 micrometer) biaxially oriented poly(ethylene terephthalate) substrate bearing vapor-deposited aluminum having a thickness affording approximately 50% optical transmission. The dry coating weights were 3.8 mg/cm². The hand spreads were cured in nitrogen in an RPC Processor Model #QC1202 ANIR (from PPG Industries) at 30 cm/sec (60 ft/min) with two standard medium pressure mercury lamps operating at 80 watts/cm². The lamps were located at a distance of about 9.5 cm from the backing.

The microwave tape performance of various tackified and non-tackified polymers cured under different conditions is given in Table 1. This data shows that in general, radiation curable poly($\alpha$-olefin) polymers with higher inherent viscosities produce cured adhesive films having superior shrink back, scorch values, and crack values. The data also shows that in general, blending tackifying resins with the poly($\alpha$-olefin) prior to cure produces cured adhesive films having higher peel adhesion values.

TABLE 1

(Microwave Performance of Radiation-Curable Polyolefins)

| Tape | Polymer | Tackifier (Phr) | UV passes | Peel value (N/dm) | Shrink back (%) | Crack value | Scorch value |
|---|---|---|---|---|---|---|---|
| 1 | $A_1$ | — | — | 28 | 36 | 2 | 1 |
| 2 | $A_1$ | — | 2 | 29 | 50 | 1 | 1 |
| 3 | $A_2$ | — | — | 22 | 45 | 3 | 1 |
| 4 | $A_2$ | — | 2 | 21 | 32 | 1 | 1 |
| 5 | $A_2$ | $T_1$ (18) | — | 69 | 18 | 1 | 1 |
| 6 | $A_2$ | $T_1$ (18) | 2 | 67 | 5 | 1 | 1 |

TABLE 1-continued (Microwave Performance of Radiation-Curable Polyolefins)

| Tape | Polymer | Tackifier (Phr) | UV passes | Peel value (N/dm) | Shrink back (%) | Crack value | Scorch value |
|---|---|---|---|---|---|---|---|
| 7 | A₃ | — | — | 18 | 4 | 1 | 1 |
| 8 | A₃ | — | 2 | 17 | 5 | 1 | 1 |
| 9 | A₃ | T₁ (18) | — | 65 | 4 | 1 | 1 |
| 10 | A₃ | T₁ (18) | 2 | 65 | 3 | 1 | 1 |
| 11 | B₁ | — | — | 16 | 25 | 1 | 1 |
| 12 | B₁ | — | 4 | 13 | 3 | 1 | 1 |
| 13 | B₂ | — | — | 24 | 15 | 1 | 1 |
| 14 | B₂ | — | 4 | 21 | 2 | 1 | 1 |
| 15 | B₂ | T₁ (33) | — | 59 | 10 | 2 | 1 |
| 16 | B₂ | T₁ (18) | 2 | 58 | 3 | 1 | 1 |
| 17 | C₁ | — | — | 29 | 45 | 4 | 1 |
| 18 | C₁ | — | 2 | 24 | 52 | 4 | 1 |
| 19 | C₂ | — | — | 26 | 37 | 4 | 3 |
| 20 | C₂ | — | 2 | 25 | 35 | 4 | 3 |
| 21 | C₃ | — | — | 18 | 2 | 1 | 1 |
| 22 | C₃ | — | 2 | 16 | 2 | 1 | 1 |
| 23 | C₃ | T₂ (33) | — | — | 3 | 1 | 1 |
| 24 | C₃ | T₂ (33) | 4 | 85 | 2 | 1 | 1 |
| 25 | C₃ | T₁ (33) | — | 68 | 1 | 1 | 1 |
| 26 | C₃ | T₁ (33) | — | — | 1 | 1 | 1 |
| 27 | D | — | — | — | 25 | 2 | 1 |
| 28 | D | — | 2 | — | 5 | 1 | 1 |
| 29 | D | T₁ (33) | — | 92 | 35 | 1 | 1 |
| 30 | D | T₁ (33) | 2 | — | 2 | 1 | 1 |

Phr = parts per 100 parts of the adhesive
T₁ = ARKON P115 ™ brand tackifier (Arakawa Chemicals, Japan)
T₂ = REGALREZ 1126 ™ brand tackifier (Hercules, Wilmington, DE)

Pressure-Sensitive Adhesive Tapes 31–50

Either Polymer E or Polymer F, hydro-siloxane the formula Me₃SiO(SiMeHO)₃₅SiMe₃ wherein Me=-methyl, (amounts indicated in Table 2) and 1.25 parts of 2-ethylhexyl maleate, an inhibitor included to prevent room temperature cure of the composition were dissolved in 300 parts of toluene. A pressure-sensitive adhesive composition (approximately 33% nonvolatiles) was obtained by adding a platinum catalyst, bis(divinyltetramethyldisiloxane)Pt(0) to this mixture in an amount indicated in Table 2. The composition was coated on the vapor coated side of 0.96 mil (24.4 micrometer) biaxially oriented poly(ethylene terephthalate) substrate bearing vapor-deposited aluminum having a thickness affording approximately 50% optical transmission. The solvent was evaporated off at room temperature followed by heating at 150° C. for 5 minutes to ensure complete cure (probably curing for one minute at that temperature would be sufficient). The dry coating weights were 3.8 mg/cm².

Microwave performance of various tapes were evaluated, and the results are summarized in Table 2. The data show that moderate to high concentrations of hydro-siloxane crosslinker are required to produce cured PSA films having acceptable shrink back, scorch values, and crack values.

TABLE 2

(Microwave Performance Thermally-Curable Hydrosilane Polyolefins)

| Tape | Polymer (parts) | H-Siloxane (parts) | Tackifier (Phr) | Pt cat. (ppm) | Peel Value (N/dm) | Shrink Back (%) | Crack Value | Scorch Value |
|---|---|---|---|---|---|---|---|---|
| 31 | E (100) | — | — | — | 18 | 75 | 4 | 4 |
| 32 | E (99.8) | 0.2 | — | 10 | 11 | 2 | 1 | 1 |
| 33 | E (99.8) | 0.2 | — | 100 | 6 | 2 | 1 | 1 |
| 34 | E (99.5) | 0.5 | — | 10 | 10 | 3 | 1 | 1 |
| 35 | E (99.5) | 0.5 | — | 100 | 10 | 2 | 1 | 1 |
| 36 | E (99.5) | 0.5 | T₃ (33) | 10 | 16 | 5 | 2 | 1 |
| 37 | E (99.5) | 0.5 | T₃ (33) | 100 | 19 | 5 | 1 | 1 |
| 38 | E (99.8) | 0.2 | T₂ (18) | 10 | 32 | 3 | 1 | 1 |
| 39 | E (99.5) | 0.5 | T₂ (33) | 50 | 23 | 1 | 1 | 1 |
| 40 | E (99.5) | 0.5 | T₂ (33) | 100 | 19 | 5 | 2 | 1 |
| 41 | E (99.9) | 0.1 | — | 10 | 58 | 25 | 3 | 2 |
| 42 | E (99.9) | 0.1 | — | 100 | 85 | 30 | 2 | 2 |
| 43 | F (100) | — | — | — | 15 | 80 | 4 | 4 |
| 44 | F (99.5) | 0.5 | — | 50 | 8 | 2 | 1 | 1 |
| 45 | F (99.5) | 0.5 | — | 100 | 5 | 1 | 1 | 1 |
| 46 | F (99.5) | 0.5 | — | 10 | 7 | 1 | 1 | 1 |
| 47 | F (99.5) | 0.5 | T₃ (18) | 100 | 17 | 1 | 1 | 1 |
| 48 | F (99.5) | 0.5 | T₃ (33) | 100 | 37 | 1 | 1 | 1 |
| 49 | F (99.5) | 0.5 | T₂ (18) | 100 | 5 | 1 | 1 | 1 |
| 50 | F (99.5) | 0.5 | T₂ (33) | 100 | 6 | 1 | 1 | 1 |

T₃ = WINGTACK PLUS ™ brand tackifier (Goodyear Chemical Co.)

Pressure-Sensitive Adhesive Tapes 51–62

Either Polymer G or Polymer H, and a hydrosiloxane having the formula Me₃SiO(SiMeHO)₃₅SiMe₃, (amounts indicate in Table 3) were dissolved in 300 parts of toluene. A pressure-sensitive adhesive composition (approximately 33% nonvolatiles) was obtained by adding cyclopentadienyltrimethylplatinum (CpPtMe₃), a thermally stable photocatalyst, to this mixture in an amount indicated in Table 3. The composition was coated on the vapor coated side of 0.96 mil (24.4 micrometer) biaxially oriented poly(ethylene terephthalate) substrate bearing vapor-deposited aluminum having a thickness affording approximately 50% optical transmission. The solvent was evaporated off at room temperature. The hand spreads were cured in nitrogen in an RPC Processor Model #ZC1202 ANIR (from PPG Industries) at 30 cm/sec (60 ft/min) with two standard medium pressure mercury lamps operating at 80 watts/cm². The lamps were located at a distance of about 9.5 cm from the backing. The dry coating weights were 3.8 mg/cm².

Microwave performance of various tapes were evaluated, and the results are summarized in Table 3. This data shows that when the inherent viscosity of the radiation curable hydro-siloxane poly(α-olefin) polymer is greater that 1.5 dl/g, the cured PSA films tend to have acceptable shrink back, scorch values, and crack values.

TABLE 3
(Microwave Performance of Radiation-Curable Hydrosiloxane Polyolefins)

| Tape | Polymer (parts) | H-Siloxane (parts) | CpPtMe$_3$ catalyst (ppm) | UV Passes | Peel value (N/dm) | Shrink back (%) | Crack value | Scorch value |
|---|---|---|---|---|---|---|---|---|
| 51 | G (99.5) | 0.5 | 10 | 2 | 13 | 25 | 4 | 1 |
| 52 | G (99.5) | 0.5 | 30 | 2 | 12 | 8 | 1 | 1 |
| 53 | G (99.5) | 0.5 | 50 | 2 | 11 | 4 | 1 | 1 |
| 54 | G (99.5) | 0.5 | 100 | 2 | 9 | 2 | 1 | 1 |
| 55 | G (99.5) | 0.5 | 150 | 2 | 8 | 2 | 1 | 1 |
| 56 | G (99.5) | 0.5 | 200 | 2 | 7 | 2 | 2 | 1 |
| 57 | G (99.5) | 0.5 | 250 | 2 | 7 | 1 | 1 | 1 |
| 58 | G (99.5) | 0.5 | 500 | 2 | 5 | 1 | 1 | 1 |
| 59 | H (99.5) | 0.5 | 50 | 2 | 10 | 17 | 1 | 2 |
| 60 | H (99.5) | 0.5 | 100 | 2 | 10 | 4 | 2 | 3 |
| 61 | H (99.5) | 0.5 | 153 | 2 | 9 | 4 | 3 | 1 |
| 62 | H (99.5) | 0.5 | 251 | 2 | 7 | 2 | 2 | 1 |

Pressure-Sensitive Adhesive Tapes 63-72

Solutions of tackified and non-tackified Polymer I in toluene solvent were knife coated on the vapor coated side of 0.96 mil (24.4 micrometer) biaxially oriented poly(ethylene terephthalate) substrate bearing vapor-deposited aluminum having a thickness affording approximately 50% optical transmission. Some of the solutions contained dibutyltindilaurate catalyst as indicated in Table 4. The dry coating weights were 3.8 mg/cm$^2$. The microwave tape performance of various tackified and non-tackified polymers under different conditions is given in Table 4. Tapes No. 63 and 64, as comparative examples are included in Table 4 to show the need to hydrosilate an α-olefin polymer in order to moisture-cure the polymer.

Microwave performance of various tapes were evaluated, and the results are summarized in Table 4.

TABLE 4
(Microwave Performance of Moisture-Curable Polyolefins)

| Tape | Polymer | Tackifier (Phr) | Sn cat. (Wt %) | Peel Value (N/dm) | Shrink Back (%) | Crack Value | Scorch Value |
|---|---|---|---|---|---|---|---|
| 63 | I | — | — | 16 | 50 | 3 | 4 |
| 64 | I | — | 1 | 15 | 65 | 4 | 4 |
| 65 | I | — | — | 9 | 7 | 2 | 2 |
| 66 | I | — | 1 | 12 | 5 | 1 | 1 |
| 67 | I | T$_3$ (33) | — | 32 | 5 | 1 | 1 |
| 68 | I | T$_3$ (33) | 1 | 30 | 2 | 1 | 1 |
| 69 | I | T$_2$ (33) | — | 18 | 5 | 2 | 1 |
| 70 | I | T$_2$ (33) | 1 | 17 | 3 | 1 | 1 |
| 71 | I | T$_1$ (33) | — | 26 | 3 | 2 | 1 |
| 72 | I | T$_1$ (33) | 1 | 24 | 2 | 1 | 1 |

Pressure-Sensitive Adhesive Tapes 73-94

Solutions of Polymer C$_2$ and each of several thermoplastic polymers in toluene were mixed in an 8 ounce glass jar on a laboratory shaker. The adhesive blend polymers were:

Z$_1$ = Butyl rubber TM 269 (Exxon Chemicals)
Z$_2$ = generic name VISTANEX TM MNL-140 (Exxon Chemicals)
Z$_3$ = Copolymer of isooctyl acrylate and acrylic acid (95/5)
Z$_4$ = 60 parts styrene/isoprene/styrene block copolymer (Kraton 1107 TM Shell Chemical Co.) plus 40 parts WINGTACK PLUS TM (Goodyear Chemical Co.)
Z$_5$ = microwave susceptor adhesive (No. 24848 TM, Swift Adhesives, Downers Grove, Ill.)

The blend was knife coated on the vapor coated side of 0.96 mil (24.4 micrometer) biaxially oriented poly(ethylene terephthalate) substrate bearing vapor-deposited aluminum having a thickness affording approximately 50% optical transmission. After drying as in Examples 1-30, the dry coating weights were 3.8 mg/cm$^2$.

The microwave performance of the tapes is given in Table 5. The data generally shows that as the concentration of radiation curable poly(α-olefin) polymer in the blend increases, the microwave performance of uncured PSA films generally improves.

TABLE 5
(Microwave Performance of Blends)

| Tape | Polymer C (parts) | Adhesive (parts) | Shrink back (%) | Crack value | Scorch value |
|---|---|---|---|---|---|
| 73 | — | Z$_1$ (100) | 10 | 3 | 4 |
| 74 | 5 | Z$_1$ (95) | 5 | 2 | 3 |
| 75 | 10 | Z$_1$ (90) | 5 | 2 | 3 |
| 76 | 15 | Z$_1$ (85) | 3 | 1 | 1 |
| 77 | 25 | Z$_1$ (75) | 2 | 1 | 1 |
| 78 | 1 | Z$_2$ (100) | 15 | 3 | 4 |
| 79 | 5 | Z$_2$ (95) | 10 | 3 | 3 |
| 80 | 10 | Z$_2$ (90) | 5 | 2 | 2 |
| 81 | 15 | Z$_2$ (85) | 5 | 1 | 1 |
| 82 | 25 | Z$_2$ (75) | 5 | 1 | 1 |
| 83 | — | Z$_3$ (100) | 15 | 4 | 4 |
| 84 | 5 | Z$_3$ (95) | 15 | 3 | 3 |
| 85 | 10 | Z$_3$ (90) | 15 | 3 | 1 |
| 86 | 15 | Z$_3$ (85) | 15 | 2 | 1 |
| 87 | 25 | Z$_3$ (75) | 15 | 2 | 1 |
| 88 | — | Z$_4$ (100) | 80 | 4 | 2 |
| 89 | 5 | Z$_4$ (95) | 65 | 4 | 2 |
| 90 | 10 | Z$_4$ (90) | 65 | 4 | 2 |
| 91 | 15 | Z$_4$ (85) | 65 | 4 | 2 |
| 92 | 25 | Z$_4$ (75) | 65 | 4 | 1 |
| 93 | — | Z$_5$ (100) | 5 | 4 | 4 |
| 94 | 10 | Z$_5$ (90) | 5 | 2 | 2 |

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A food package comprising a piece of a microwave-active tape comprising layers of (a) an oriented backing material, (b) a microwave-active material, and (c) a pressure-sensitive adhesive, wherein said pressure-sensitive adhesive comprises a polymeric α-olefin that has been cured and has a "Peel" value of at least 5 N/dm and a "Shrink Back" value at 220° C. of less than 5%.

2. The food package as described in claim 1, wherein said microwave active tape provides automatic venting.

3. A microwave-active tape comprising in sequence:

a) a backing material,
b) a microwave active material layer, and
c) a layer of pressure sensitive adhesive, wherein the pressure sensitive adhesive comprises a cured polymeric α-olefin and has a "Peel" value of at least 5 N/dm and a "Shrink Back" value at 220° C. of less than 5%.

4. The microwave-active tape as described in claim 2, wherein said polymeric α-olefin is selected from a group consisting of radiation curable poly(α-olefin), thermally-curable hydrosiloxane poly(α-olefin), radiation-curable hydrosiloxane poly(α-olefin), and moisture-curable poly(α-olefin).

5. The microwave active tape as described in claim 4, wherein the radiation curable poly(α-olefin) has an inherent viscosity in the range of 4.0 to 9.0 dl/g.

6. The microwave active tape as described in claim 4, wherein the moisture curable poly(α-olefin) has an inherent viscosity in the range of 4.0 to 9.0 dl/g.

7. The microwave-active tape as described in claim 4, wherein said poly(α-olefin) is blended with at least one thermoplastic polymer.

8. The microwave-active tape as described in claim 2, wherein said microwave active material and pressure-sensitive adhesive are in separate, adjacent layers.

9. The microwave active tape as described in claim 3, wherein said backing material comprises a low-adhesion carrier web, which can be stripped off prior to applying the microwave active tape to a microwave food package.

10. The microwave active tape as described in claim 3, wherein said backing material comprises a heat-resistant polymeric substrate.

11. The microwave-active tape as described in claim 10, wherein said heat-resistant polymeric substrate is biaxially-oriented polypropylene.

12. The microwave-active tape as described in claim 10, wherein said heat-resistant polymeric substrate is biaxially-oriented poly(ethylene terephthalate).

13. The microwave-active tape as described in claim 10, wherein said heat-resistant polymeric substrate is poly(4-methylpent-1-ene).

14. The microwave active tape as described in claim 3, wherein said microwave active material layer converts microwave energy into sensible heat.

15. The microwave active tape as described in claim 14, wherein said microwave active material layer comprises at least one of
  (a) a thin metallized polymeric substrate,
  (b) a thin coating of conductive paint on a polymeric substrate, wherein said conductive paint comprises graphite, carbon black, or metallic particles or flakes, and
  (c) a thin coating of conductive particles in an organic binder, wherein said particles are carbon black or graphite.

16. The microwave active tape as described in claim 3, wherein said microwave active material layer reflects microwave energy.

17. The microwave active tape as described in claim 16, wherein said microwave active material comprises at least one of a metal foil having a thickness greater than 1 micrometer, and a metal mesh having openings greater than 2 mm in diameter.

18. The microwave active tape as described in claim 4, wherein the pressure sensitive adhesive is hot melt coatable when the inherent viscosity of the radiation curable poly α-olefin is in the range of 1.5 to 4.0 dl/g.

19. The microwave active tape as described in claim 4, wherein the pressure sensitive adhesive is hot melt coatable when the inherent viscosity of the moisture curable poly α-olefin is in the range of 1.5 to 4.0 dl/g.

20. The microwave active tape as described in claim 4, wherein the thermally curable poly α-olefin has an inherent viscosity in the range of 1.5 to 9.0 dl/g.

* * * * *

UNITED STATES PATENT AND TRADEMARK OFFICE
CERTIFICATE OF CORRECTION

PATENT NO. : 5,298,708
DATED : March 29, 1994
INVENTOR(S) : Babu et al.

It is certified that error appears in the above-indentified patent and that said Letters Patent is hereby corrected as shown below:

Col. 3, line 65, Replace "1" with --11--.

Col. 8, line 60, Replace "$M^2$" with --$M^5$--.

Col. 13, line 57, Insert --having-- after "hydro-siloxane".

Col. 14, line 44, Replace "indicate" with --indicated--.

Signed and Sealed this

Thirtieth Day of August, 1994

Attest:

BRUCE LEHMAN

Attesting Officer

Commissioner of Patents and Trademarks